Sept. 12, 1939.  M. S. JOHNSON  2,172,976
BRAKE HANGER RETAINER LOCKING MEANS
Filed Jan. 26, 1938
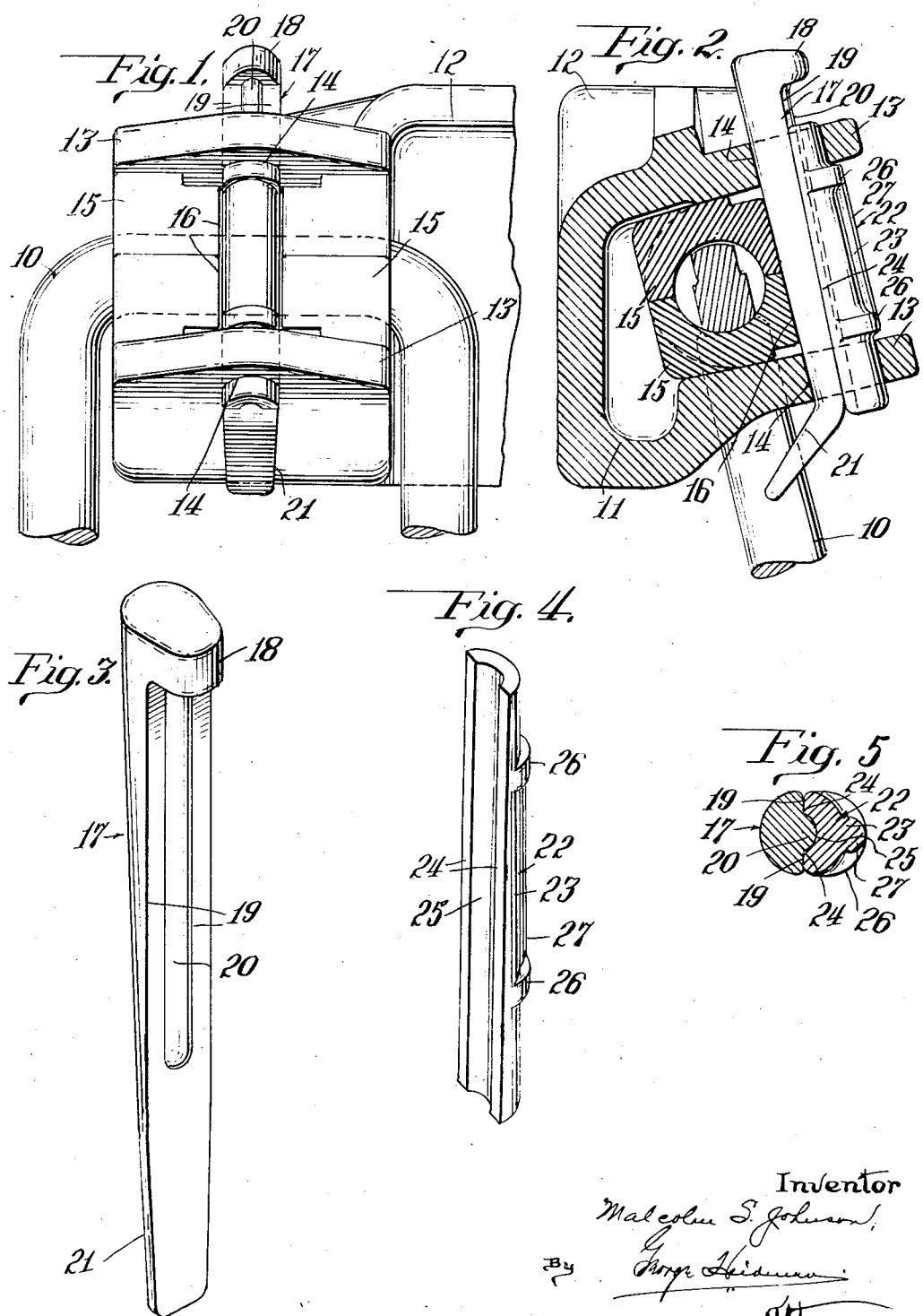
Inventor
Malcolm S. Johnson,
By George Heidman
Attorney Patented Sept. 12, 1939

2,172,976

UNITED STATES PATENT OFFICE 2,172,976

BRAKE HANGER RETAINER LOCKING MEANS

Malcolm S. Johnson, Chicago, Ill., assignor to Illinois Railway Equipment Company, Chicago, Ill., a corporation of Illinois Application January 26, 1938, Serial No. 186,923

2 Claims. (Cl. 188—211)

My invention relates to means whereby the brake hanger holding element or retainer, usually consisting of a pair of superposed or juxtaposed members, is wedgingly forced toward the rear of the pocket or socket formed in the bracket of the truck side frame and securely locked in place against movement or accidental removal.

The invention, more specifically stated, consists of a main member or pin, of material to permit slight flexing or bending at one end, and a complemental member provided with a surface to match the contacting face of the main member, whereby a snug fitting relation with the holes in the bracket of the track frame is provided and the brake hanger retaining means held against vibration in the pocket or socket of the truck side frame bracket; the complemental members being adapted to take up any slight variations or differences in the dimensions of the retaining means and the bracket socket or pocket; while at the same time eliminating the difficulties heretofore encountered with the bolts and nuts employed for securing the retainers in place.

The objects and advantages of my invention will all be readily comprehended from the following detailed description of the accompanying drawing, wherein:

Figure 1 is a front elevation of the bracket portion of a truck side frame with the hanger retainer means and my improved locking means in place and the lower end of the hanger broken away.

Figure 2 is a vertical sectional view of the structure as illustrated in Figure 1, with the locking means shown in side elevation.

Figure 3 is a perspective view of the main member or pin.

Figure 4 is a similar view of the complemental member or adapter.

Figure 5 is a cross sectional view of the associated members in juxtaposed position.

My improved locking means is especially intended for use with retainers adapted to hold the continuous or closed link type of hanger, shown at 10, in the pocket or socket 11 formed in the outer end of the arm or bracket 12 generally formed integral with the truck side frame of a railroad car; the side of the bracket which is disposed toward the wheels of the truck being provided with the vertically spaced portions 13, 13 to provide the socket 11 therebetween, with the inner end of the socket closed, as clearly shown in Figure 2; while the outer ends of the jaws or spaced portions 13, 13 are provided with registering bolt-receiving holes at 14.

In practice, the portions 13, 13 are preferably arranged to slope somewhat upwardly toward their outer ends to provide the inwardly sloping socket 11 as shown.

The jaws or portions 13, 13 are spaced apart sufficiently to receive the hanger retaining means therebetween. In the exemplification, the retaining means is shown in the nature of two superposed blocks or plates 15, 15, provided with matching faces and each having a semi-circular socket to provide a cylindrical bore or suitable channel for the reception of the upper end of the brake hanger or link 10.

The outer longitudinal or forward faces of the retainer blocks 15, 15 are generally provided with vertically disposed recesses or grooves as at 16 adapted to substantially line up with the pin receiving holes 14, 14 in the jaws 13, 13 of the bracket, and thus effect locking engagement with the locking pin against movement lengthwise of the socket.

These retainer elements or blocks heretofore have been secured in place by means of a cylindrical pin or bolt threaded at one end to receive a nut. In practice, due to the constant jarring and vibration encountered, the nut had a tendency to become loose and frequently was lost, allowing the bolt to ride in a lengthwise direction out of at least one of the holes in the jaws or spaced apart portions 13 of the bracket and thus allow an improper shifting of the brake hanger retainer. Then, too, workmen often fail to screw the nuts up tightly on the bolts and these nuts become lost while the car is in transit so that replacement of the lost nuts cannot be had until the car reaches the railroad shops. Undue shifting of the retainer elements causes an improper positioning of the brakes for effective braking action.

My invention contemplates retainer locking means in the nature of a pin or main element 17 of length greater than the distance from the top of the upper jaw 13 of the bracket to the bottom of the lower jaw 13 of the bracket; and this pin element 17 at its upper end is provided with an offset or head forming portion 18 of dimensions greater than the size of the hole 14 in the bracket.

One side of the pin is provided with a flat surface 19 extending from the head 18 to the lower end and tapered toward the lower end as more clearly shown in Figure 2, thus providing a pin of non-circular cross section. This flat face of the pin is provided with a longitudinally disposed rib 20, preferably of arcuate form, which extends from the head 18 a distance sufficient to extend to the lower jaw 13 of the bracket when the pin is inserted in place as shown in Figure 2. The opposite or arcuate side of the pin 17 is also slightly tapered as shown at 21; the pin being preferably forged from wear resisting and slightly bendable metal.

The flat side of the pin 17 is adapted to receive a complementary member or adapter 22 shown in detail in Figure 4 and which may be of cast metal. The complemental member 22 is of length somewhat greater than the distance from the upper jaw 13 to the lower jaw 13; with the outer side 23 made arcuate while the opposite side 24 is flat to match the flat surface 19 of pin 17 and this flat side 24 provided with an arcuate groove 25, extending from end to end, adapted to receive the arcuate rib 20 of the pin 17. The flat or non-circular side 24 of the adapter or complemental member 22 is tapered from end to end so that the thickness of the member 22 gradually increases from the upper end to the lower end In other words, the taper of the adapter, when associated with the pin 17, is in a direction opposite to that of pin 17.

The outer or arcuate side 23 of the adapter 22 at predetermined distances from the ends is shown provided with transversely disposed ribs or shoulders 26, 26; and this side of the adapter, intermediate of the shoulders 26, 26 may be provided with a reenforcing longitudinally disposed rib as at 27, see Figure 2. The ends of the adapter 22 are arcuate and adapted to extend into the holes 14, 14 in the upper and lower jaws of the bracket.

In practice, after the retainer members 15, 15 with the intervening brake hanger 10, have been inserted in the socket or pocket of the bracket 12, the complemental member or adapter 22 is then inserted through the holes 14, 14 of the jaws of the pocket, with the arcuate or shouldered side disposed outwardly toward the outer ends of the jaws and with the shoulders 26, 26 arranged between the jaws 13, 13, as shown in Figure 2; the larger or thicker end of the adapter being at the bottom. The main member or pin 17 is then inserted from the top through the holes 14, 14, with its flat or ribbed side disposed toward the grooved side of the adapter; the combined thickness of the pin 17 and adapter 22 at a point above the taper 21 of the lower end of the pin 17 and at a distance below the head 18 of the pin, being approximately equal to the diameter of the holes 14, 14 in the jaws of the bracket. As a result, when pin 17 is driven farther downward the adapter 22 will cause the pin 17 to be firmly wedged in place against removal. After the pin 17 has been driven into firm wedging or binding relation with the walls of the holes 14, 14, the lower portion of the pin 17, namely the tapered portion 21, is then preferably given a hammer-blow so as to bend it slightly toward one side as shown in Figure 2, thus preventing unauthorized removal of the pin to be easily made.

In view of the fact that the combined thickness of the pin and adapter increases as the head of the pin is driven downwardly, the locking means also effects greater wedging action on the retainer members 15, 15 and causes the latter to be firmly driven into the socket or pocket of the bracket; it being apparent from the construction that my improved locking means will adapt itself to slight variations in the dimensions of the retainer members and the vertical dimensions of the pocket, as well as to slight variations in the diameters of the holes 14, 14 in the jaws of the bracket. It is also evident that accidental removal and loss of the locking means is impossible after the lower tapered end of pin 17 has been bent as shown and described because the shoulders 26, 26 on the complemental member or adapter will prevent movement thereof while the pin proper is driven downwardly, and, as a result, the brake hanger will always be kept in proper position, thus eliminating the undesirable losses and conditions heretofore encountered.

The construction shown and described is believed to be the simplest embodiment of the invention, but certain modifications may be possible without, however, departing from the spirit of my invention as defined in the appended claims.

What I claim is:

1. Brake hanger retainer locking means comprising an elongated pin member having a head at one end and a flat side extending from the head to the tail end of the pin, the pin being of segmental cross section with the flat side tapering toward the tail end and provided with a longitudinally disposed rib extending from the head to a point removed from the tail end of the pin; and a complemental member of segmental cross section increasing in thickness from top to bottom with the flat side adapted to match the flat side of the pin and said side provided with a groove extending from end to end to match and receive the rib of said pin member to prevent lateral movement between the pin and member, the outer arcuate side of the complemental member at points removed from the ends thereof being provided with laterally disposed shoulder-forming portions adapted to prevent longitudinal movement of said member in either direction.

2. Brake hanger retainer locking means comprising a pin having an arcuate side and a substantially flat side and provided with a head at one end disposed beyond the flat side, the pin being tapered toward the tail end thereof and the flat side provided with a longitudinally disposed rib extending from the head to a point removed from the tail end thereof; and a complemental member of segmental cross section increasing in thickness toward the lower end and of length approximating the length of the rib on the pin with the pin contacting side of said member grooved from end to end to match and receive the rib on the pin to prevent lateral movement between the pin and said member while permitting longitudinal movement between the pin and member, the arcuate side of said complemental member at distances removed from the ends being provided with a shoulder forming portion adapted to hold the member in place between the jaws of a brake hanger receiving bracket.

MALCOLM S. JOHNSON.